United States Patent [19]

Turer et al.

[11] Patent Number: 5,553,960
[45] Date of Patent: Sep. 10, 1996

[54] FIELD SERVICEABLE DERAILLEUR DEVICE

[76] Inventors: Eric S. Turer, 157 River St., Rochdale, Mass. 01542-1117; Thomas Malay, 18 Hampton Rd., Exeter, N.H. 03833

[21] Appl. No.: 421,540

[22] Filed: Apr. 13, 1995

[51] Int. Cl.⁶ .............................. F16H 59/02; F16D 9/04
[52] U.S. Cl. ...................... 403/2; 403/19; 403/300
[58] Field of Search .................... 403/2, 11, 19, 403/300, 305, 343; 474/80, 81

[56] References Cited

U.S. PATENT DOCUMENTS

| | | | |
|---|---|---|---|
| 3,922,104 | 11/1975 | McCullough | 403/2 |
| 4,627,827 | 12/1986 | Juy | 474/80 |
| 4,838,837 | 6/1989 | Testa | 474/80 |
| 4,850,940 | 7/1989 | Nagano | 474/80 |
| 5,152,720 | 10/1992 | Browning et al. | 474/80 |

FOREIGN PATENT DOCUMENTS 729910  8/1932  France ..................... 474/80

*Primary Examiner*—Anthony Knight
*Assistant Examiner*—Andrea Chop
*Attorney, Agent, or Firm*—Gary E. Lambert; Scott B. Garrison

[57] ABSTRACT

A device designed to replace the existing mounting bolt and snap-ring on most derailleurs. A head and barrel are connected to retain the spring and tension adjusting components of the derailleur and to serve as a receptacle for a pin. The pin attaches directly to the derailleur hanger of the bicycle and is designed to withstand normal pedaling forces, while assuring separation prior to excessive yielding of the derailleur. The pin is manufactured with an opening so that a tool can be inserted in it to easily remove the separated pieces. As a result, damage to the frame and derailleur is prevented and the bicycle can be easily repaired by replacement of the pin.

7 Claims, 4 Drawing Sheets

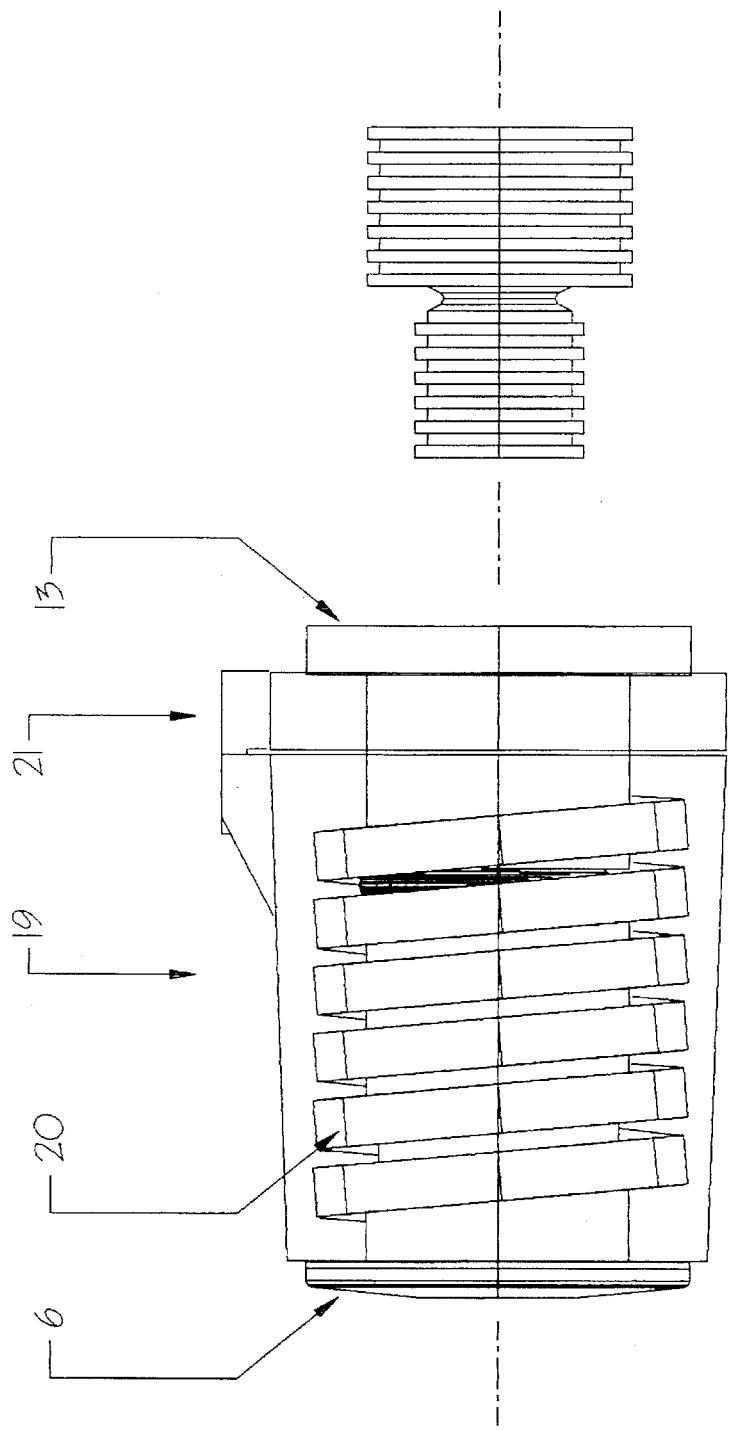

FIELD SERVICEABLE DERAILLEUR DEVICE

BACKGROUND

Mountain biking, a branch of the bicycle industry that has become increasingly popular, has evolved to provide off-road equipment for transportation, racing, and recreation. The derailleur assembly of a bike often disables when an object, such as a stick or rock, impacts the derailleur or becomes wedged between the derailleur and the frame or the wheel of the bicycle. Damage to the frame, the derailleur, or the derailleur hanger almost always results. With the limitations on weight and space, it is impractical for a rider to carry sufficient spare parts or tools to repair the damage at the site. The repairs, if possible, will be costly and time consuming. As a result, the bike becomes disabled, and the rider is stranded.

In the past, a weak link between the derailleur and the frame has been used to attempt to protect the bicycle frame from damage. A deformable derailleur hanger protects the frame but does not extend to preserving the derailleur. A softer mounting bolt has a tendency to fail and flex excessively under reasonable loading. In addition, neither of these designs makes field repair practicable.

For the foregoing reasons, there is a need for a device that is small, inexpensive, and serviceable by the rider which reduces repair time and damage to the frame, the derailleur, and the derailleur hanger.

SUMMARY

The present invention is directed to a device that satisfies this need for reducing the repair time and damage to the frame, derailleur, and derailleur hanger. A field serviceable derailleur device having features of the present invention comprises a head, a barrel, and a pin. The head and barrel connect to permanently enclose the upper derailleur spring and tension adjusting component in the derailleur's upper spring housing. A pin is designed to mate with the barrel and a derailleur hanger and incorporates a notch to allow for a precise area to fracture prior to excessive yielding of the derailleur. A flange on the barrel isolates the fracture point from the bicycle derailleur hanger and the barrel threads. The flange also acts to counter bending moments in the pin created by forces on the derailleur, thereby placing the pin primarily in tension. An opening in the pin allows a tool to be inserted for removal of the pieces of the fractured pin. Both the head and the barrel have an opening lengthwise to allow for adjustment without the head and barrel separating during installation.

One objective of this invention is to control the application of stresses on the pin such that bending forces are converted largely to tensile forces along the length of the pin, in order to reduce excessive flex under normal loading.

A second objective of this invention is to control the location of the fracture to insure that neither the frame, the derailleur, nor the permanent parts of the device are damaged.

Another objective of this invention is that it allows for extremely simple serviceability, since the pieces of the fractured pin may be easily removed using the opening of the pin, allowing a new pin to be installed. The rider does not need to reestablish tension for the spring in order to remount the derailleur.

A further objective of this invention is that a significant reduction in weight and space is accomplished.

An additional objective is to protect the derailleur and frame via pin fracture.

Another objective is that parts are not lost after fracture of pin.

A further objective is ease of repair in the field (size, weight, part removal/installation).

These and other objectives and advantages of the invention will appear more fully from the following description made in conjunction with the accompanying drawing wherein like reference characters refer to the same or similar parts throughout the several views.

BRIEF DESCRIPTION OF THE DRAWINGS

FIG. 4 is a side view of a head and barrel encased in the derailleur housing.

DESCRIPTION

Figure 1:
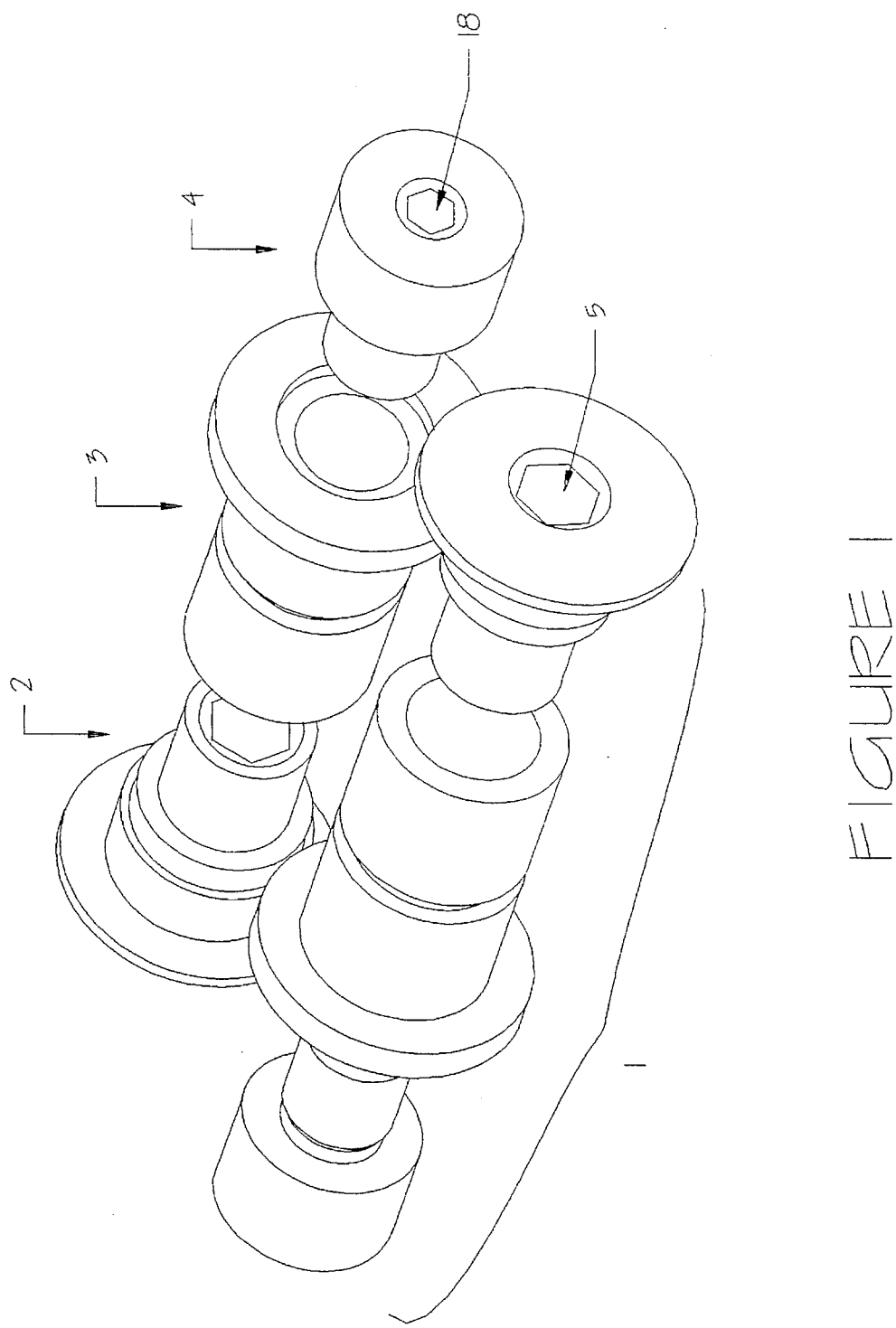
FIG. 1 is an exploded perspective view of the device.

Referring to FIG. 1, head 2, barrel 3, and pin 4 are shown in perspective to demonstrate how derailleur device 1 is assembled.

Figure 2:
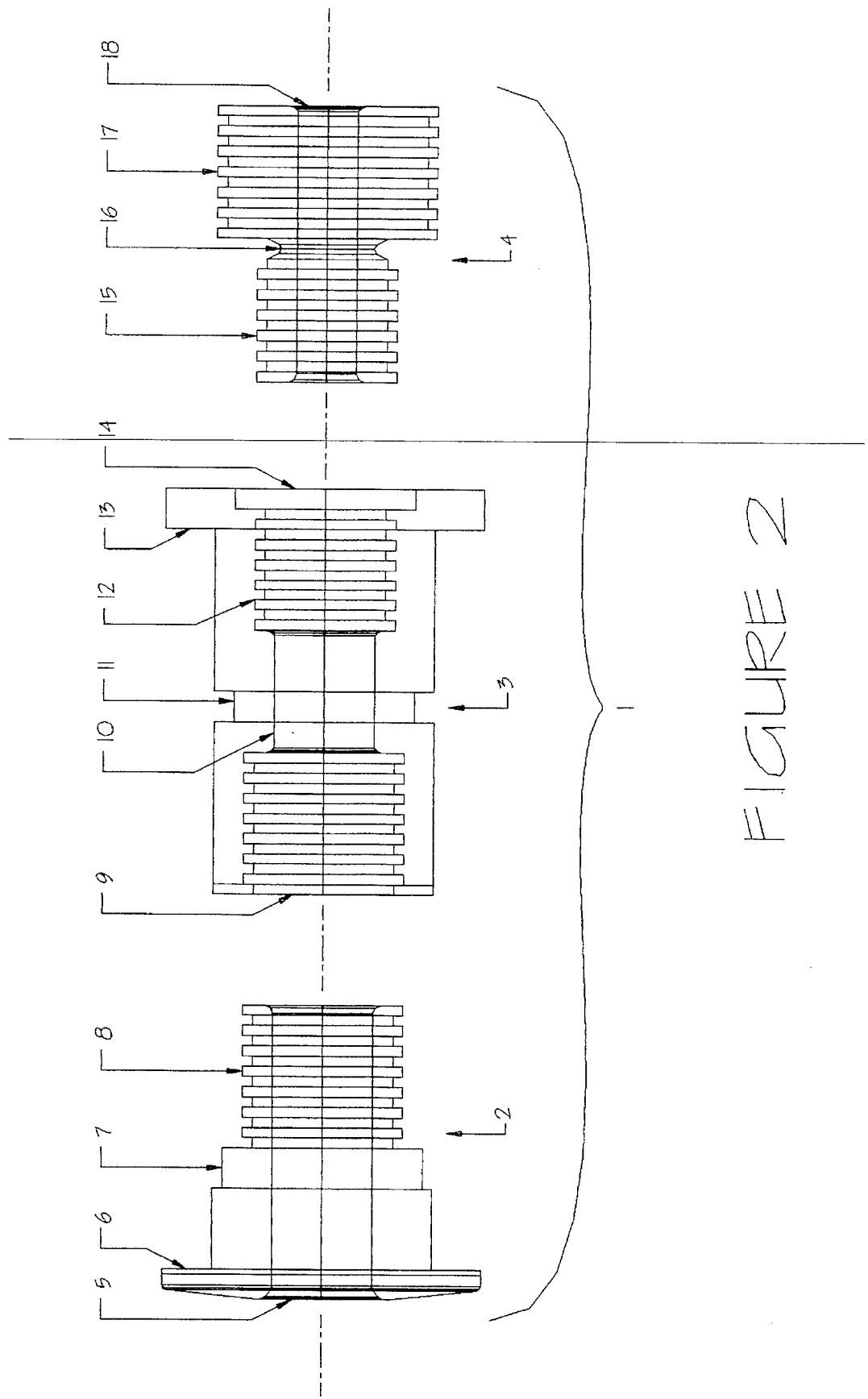
FIG. 2 is an exploded side view of the device.

Referring to FIG. 2, the connection between head 2 and barrel 3 is demonstrated by use of head-barrel external connector 8 of head 2 and barrel-head internal connector 9 of barrel 3. Barrel 3 is connected to pin 4 using barrel-pin internal connector 12 of barrel 3 and pin-barrel external connector 15 of pin 4. Other methods of connecting head 2, barrel 3, and pin 4 to each other can be used.

Referring again to FIG. 2, an exploded side view of device 1 is shown. As demonstrated, head 2 has head opening 5, cap 6, head barrel external connector 8, and spacer 7, which remains exposed when head 2 is connected to barrel 3. Head opening 5 runs through the full length of head 2. Although FIG. 1 demonstrates head opening 5 as hexagonal in shape for use with an Allen Wrench, head opening 5 can be any shape. When head 2 and barrel 3 are properly joined, the surface defining head opening 5 in head 2 will align with the surface defining barrel opening 10 in barrel 3. Then, a single tool may subsequently be inserted the full length of both head opening 5 and barrel opening 10, allowing the already-connected head 2 and barrel 3 to be turned as a single unit, without slipping at the junction of head 2 and barrel 3.

Figure 3:
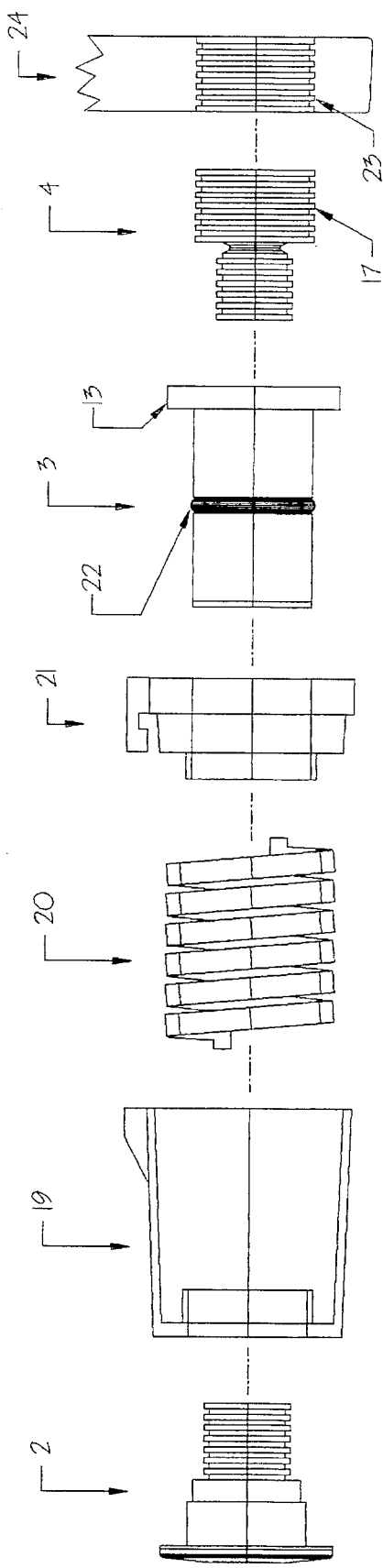
FIG. 3 is an exploded view of the device as installed in connection with a bicycle derailleur and derailleur hanger.

FIG. 3 shows how pin mounting connector 17 of pin 4 is designed to mate a conventional derailleur (19, 20, and 21) to mounting connector 23 of derailleur hanger 24. Connector 17 can be designed to standard thread pitch specifications, thus allowing pin 4 to mate with the mounting connector 23 of any derailleur hanger 24.

As shown in FIG. 2, pin 4 also contains notch 16. Notch 16 produces an area of minimum cross-section. While sufficiently strong to maintain the connection between derailleur (19, 20, and 21) and derailleur hanger 24, this area is designed to fracture under the excessive forces produced when a foreign object becomes wedged in the drivetrain of a bicycle. Notch 16 creates a precise fracture area where pin 4 will break prior to excessive yielding of the derailleur.

As also described in FIG. 2, barrel 3 has barrel-pin fracture spacer 14 at the end of barrel 3 that receives pin 4 such that notch 16 is clear of barrel-pin internal connector 12 in barrel 3 and mounting connector 23 when barrel flange 13 is mounted flush against derailleur hanger 24. Spacer 14 allows the two sections of pin 4, the pin-barrel external threads 15 and the pin mounting connector 17, to separate freely without damage to barrel 3 or mounting connector 23. As a result of pin 4 fracturing under excessive loading, the derailleur is freed from the bicycle frame, protecting both from damage.

The above-mentioned fracture leaves pin-barrel external threads 15 of pin 4 in barrel 3 and pin mounting connector 17 of pin 4 in derailleur hanger mounting connector 23. To allow the broken parts to be easily extracted, pin 4 incorporates a pin tool opening 18 running the full length of pin 4. The hexagonal shape of opening 18 is for demonstrational purposes and can be of any shape. Upon fracturing, pin 4 exposes two shear faces, each having an opening that can be used to remove the part for easy replacement.

Referring now to FIG. 4, head 2 and barrel 3 mate together to enclose derailleur upper spring 20 and tension adjusting component 21 in housing 19. As shown in FIG. 3, rather than using a snap-ring, as the standard bolt does, barrel 3 contains flange 13 to retain spring 20 and tension adjusting component 21 within housing 19 and to space the derailleur properly from the bike. This prevents spring 20 from releasing when pin 4 fails, as it would if the snap-ring were used. Barrel 3 may also have O-ring spacer 11 (shown in FIG. 2) to hold an O-ring 22 (FIG.3) which is used with some of the standard derailleur bolts. Ring 22 is typically a rubber O-ring. Head cap 6 creates a force against spring 20 and is held by adjusting component 21, which is supported by flange 13.

What is claimed is:

1. A device for reducing damage to a bicycle derailleur and derailleur hanger, the device comprising:

a head having a head-barrel external connector at a first end, a cap at a second end, and a head tool opening extending through said head;

a barrel having a barrel-head internal connector at a first end whereby said head-barrel external connector of said head is connected to said barrel, said barrel further having a barrel-pin internal connector and a barrel flange at a second end;

a pin having a pin-barrel external connector at a first end whereby said pin is connected to said barrel-pin internal connector of said barrel, a pin mounting connector at a second end and a pin fracture notch between said first and second ends of said pin so that when said pin is fully connected to said barrel, said barrel flange is flush against said pin mounting connector enabling said notch to fracture when excessive force is placed upon said device.

2. The device of claim 1 further comprising a barrel tool opening extending through said barrel wherein said head tool opening and said barrel tool opening are in direct alignment with each other so that a tool can be inserted through said openings.

3. The device of claim 2 further comprising a pin tool opening extending through said pin so that when said pin fractures the tool may be inserted through either fractured portion of said pin.

4. The device of claim 3 wherein said barrel flange defines a barrel pin fracture spacer which isolates said barrel-pin internal connector from damage upon fracture of said pin.

5. The device of claim 4 further comprising a pivoting means located between said cap of said head and said barrel flange of said barrel and a stationary means connected to said pin mounting connector whereby when said pin fractures, said pivoting means remains connected between said cap and said flange.

6. The device of claim 5 wherein said pivoting means is a derailleur and said stationary means is a derailleur hanger.

7. The device of claim 5 wherein when a force is applied to said pivoting means such that a bending moment is produced between said pivoting means and said stationary means, said flange acts to prevent bending of said pin thereby converting said force into a tensile force along said pin.

* * * * *